United States Patent

Sohda et al.

Patent Number: 5,614,134
Date of Patent: Mar. 25, 1997

[54] PROCESS FOR PREPARING CARBON/CARBON COMPOSITE PREFORM AND CARBON/CARBON COMPOSITE

[75] Inventors: Yoshio Sohda, Machida; Takefumi Kohno, Kawasaki; Yutaka Sanokawa, Yokohama, all of Japan

[73] Assignee: Nippon Oil Company, Limited, Tokyo, Japan

[21] Appl. No.: 445,924

[22] Filed: May 22, 1995

Related U.S. Application Data

[63] Continuation of Ser. No. 8,173, Jan. 25, 1993, abandoned.

[30] Foreign Application Priority Data

Jan. 24, 1992 [JP] Japan ................. 4-050140
Jan. 31, 1992 [JP] Japan ................. 4-057600

[51] Int. Cl.$^6$ ................................ C01B 31/00
[52] U.S. Cl. ............. 264/29.1; 264/29.5; 264/29.7
[58] Field of Search ................... 264/29.1, 29.5, 264/29.6, 29.7; 423/447.1, 447.4, 447.6

[56] References Cited

U.S. PATENT DOCUMENTS

| | | | |
|---|---|---|---|
| 3,367,812 | 2/1968 | Watts | 264/29.5 |
| 3,470,003 | 9/1969 | Waylett | 264/29.6 |
| 3,676,160 | 7/1972 | Bickerdike et al. | 264/29.5 |
| 4,426,340 | 1/1984 | Goller et al. | 264/29.1 |
| 4,776,994 | 10/1988 | Nelson et al. | 264/29.5 |
| 5,057,254 | 10/1991 | Sohda et al. | 264/29.5 |
| 5,091,164 | 2/1992 | Takabatake | 264/29.5 |
| 5,114,635 | 5/1992 | Sohda et al. | 264/29.5 |

FOREIGN PATENT DOCUMENTS

| | | |
|---|---|---|
| 0280233 | 2/1988 | European Pat. Off. . |
| 335736 | 10/1989 | European Pat. Off. . |
| 1-305857 | 12/1989 | Japan . |

*Primary Examiner*—Mathieu D. Vargot
*Attorney, Agent, or Firm*—Scully, Scott, Murphy & Presser

[57] ABSTRACT

A carbon/carbon composite is prepared without using any expensive carbon fiber fabric and without performing any complicated molding step prior to a densifying step. More specifically, a pitch-based infusiblized fiber alone, or optionally in the form of a mixture thereof with a pitch-based carbonized fiber, is subjected to carbonization and molding under uniaxial pressing to obtain a carbon/carbon composite preform. The preform is then densified using a carbonaceous matrix.

12 Claims, 1 Drawing Sheet

PROCESS FOR PREPARING CARBON/CARBON COMPOSITE PREFORM AND CARBON/CARBON COMPOSITE

This is a continuation of application Ser. No. 08/008,173 filed on Jan. 25, 1993 now abandoned.

BACKGROUND OF THE INVENTION

The present invention relates to a process for preparing a carbon/carbon composite preform and a carbon/carbon composite.

A carbon/carbon composite is a material having unique properties, for example, maintaining high strength and high elastic modulus even at such high temperatures as higher than 1,000° C. and exhibiting only a small thermal expansion coefficient. Its utilization as parts of aeronautic and space machinery and devices, brakes, furnace materials, etc. is expected.

As to the shape of an aggregate of carbon fibers which is used in the preparation of such carbon/carbon composite, two-dimensional fabrics are mainly used, and three-dimensional fabrics are also used as the case may be. Although the use of these fabrics affords carbon/carbon composites of high strength, the structure of the fabrics and the method for preparing them are complicated and the production thereof costs high.

On the other hand, in the case of using carbon fibers which are in the form of short fibers, such as chopped strands, there usually is not obtained a satisfactory reinforcing effect.

Further, in the case of performing a densifying process for preparing a carbon/carbon composite using any of such Fabrics or short fiber-like fibers, it is necessary to provide a separate process for fixing carbon fibers to each other using pitch or a thermosetting resin (binder). This process is one cause of deteriorating the productivity in the carbon/carbon composite preparing process.

It is the object of the present invention to provide a process for preparing a carbon/carbon composite without using expensive carbon fiber fabrics.

SUMMARY OF THE INVENTION

The present invention resides in a process for preparing a carbon/carbon composite preform, characterized by subjecting a pitch-based infusiblized fiber, optionally together with a pitch-based carbonized fiber, to carbonization and molding under uniaxial pressing, to obtain a carbon/carbon composite preform having a void volume of 5–70 vol. % and a bulk density of 0.10 to 1.70 g/cm$^3$.

The present invention also resides in a process for preparing a carbon/carbon composite, characterized in that the preform obtained above is densified using a carbonaceous matrix.

The present invention, in another embodiment thereof, resides in a process for preparing a carbon/carbon composite, characterized by charging a pitch-based infusiblized fiber into a vessel by forced introduction or by free falling, subjecting the fiber to carbonization and molding under uniaxial pressing to obtain a primary molded product having a void volume of 5–70 vol. % and a bulk density of 0.10–1.70 g/cm$^3$, and densifying the primary molded product using a carbonaceous matrix obtained by chemical vapor deposition and/or a carbonaceous matrix starting from a carbonaceous pitch.

The present invention, in a further embodiment thereof, resides in a process for preparing a carbon/carbon composite, characterized by subjecting a mixture containing 100 parts by weight of a pitch-based infusiblized fiber and 5–1,000 parts by weight of a pitch-based carbonized fiber to carbonization and molding under uniaxial pressing.

The present invention, in a still further embodiment thereof, resides in a process for preparing a carbon/carbon composite, characterized by subjecting a mixture containing 100 parts by weight of a pitch-based, infusiblized fiber and 5–1,000 parts by weight of a carbon fiber to carbonization and molding under uniaxial pressing to obtain a primary molded product having a void volume of 5–70 vol. % and a bulk density of 0.10–1.70 g/cm$^3$, and densifying the primary molded product using a carbonaceous material.

DETAILED DESCRIPTION OF THE INVENTION

Figure 1:
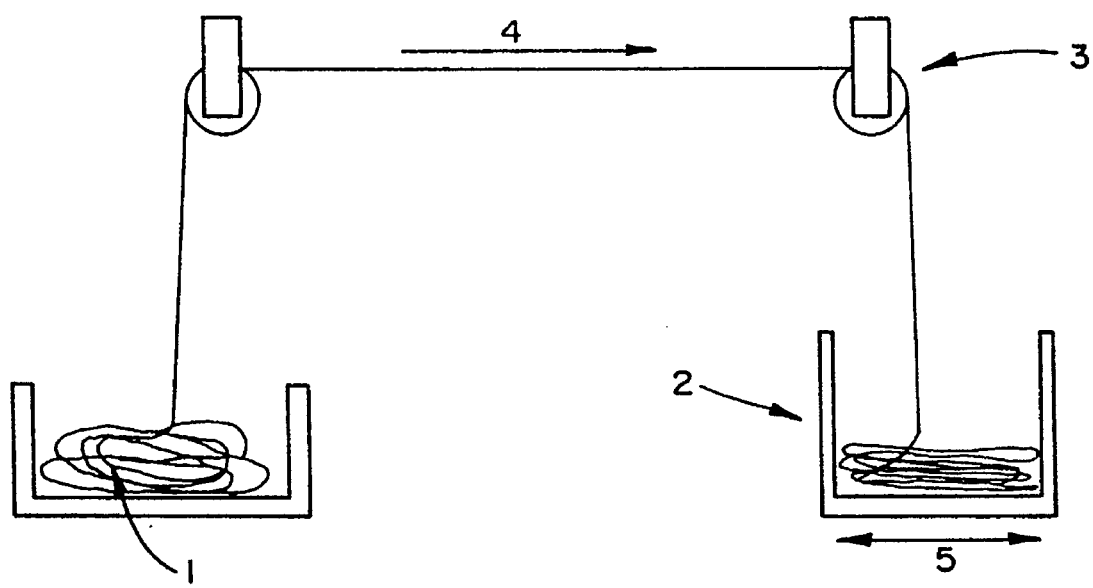
FIG. 1 is a schematic view of an apparatus used in the below-mentioned examples, in which the numeral 1 denotes infusiblized fiber, 2 a hot pressing die, 3 a pulley, 4 a moving direction of the infusiblized fiber and 5 a moving direction of the die.

The following description is now provided about how to prepare a carbon/carbon composite preform and a carbon/carbon composite according to the present invention.

The "pitch-based infusiblized fiber" as referred to herein indicates a fiber obtained by making a pitch fiber infusible. The "pitch fiber" indicates a fiber prepared by melt-spinning a carbonaceous pitch in a known manner and having an average diameter of usually 5 to 100 μm, preferably 7 to 30 μm.

The kind of the carbonaceous pitch is not specially limited. There may be used a known one. Particularly, it is desirable to use a coal or petroleum pitch having a softening point of usually 100° to 400° C., preferably 150° to 350° C. Both optically isotropic and anisotropic carbonaceous pitches are employable, but particularly preferred is an optically anisotropic pitch having an optically anisotropic phase content of 60% to 100%.

The infusiblizing treatment can be performed at a temperature of usually 50° to 400° C., preferably 100° to 350° C., in an oxidizing gas atmosphere. As the oxidizing gas there may be used air, oxygen, nitrogen oxide, sulfur oxide, halogen, or a mixture thereof. The treatment time is to such an extent as the fiber no longer exhibits a thermal fusion-bonding property, and usually it is 10 minutes to 20 hours, preferably 30 minutes to 10 hours.

In the present invention, the infusiblized fiber is subjected to carbonization and molding under uniaxial pressing to obtain a preform (i.e. primary molded product) having a void volume of 5–70 vol. % and a bulk density of 0.10–1.70 g/cm$^3$. Preferably, the infusiblized fiber is dropped forcibly or naturally into a vessel and is deposited forcibly or naturally in the vessel. In this case, the infusiblized fiber is laminated or deposited in the form of continuous fibers or short fibers of 1 to 100 cm, preferably of 2 to 50 cm. Although short fibers may be used, pulverized products are not used.

Suitable methods for charging continuous fibers into a vessel or the like, include a method in which, using a container such as a basket, infusiblized fibers are allowed to fall into a vessel for uniaxial pressing, a method in which infusiblized fibers are fed to a pulley and thereby fed uniformly into a vessel for uniaxial pressing, and a method in which infusiblized fibers are charged into a vessel forcibly through an air ejector.

As examples of methods for charging short fibers into a vessel or the like, there are mentioned a method in which, infusiblized fibers which have been made into short fibers are deposited by free falling into a vessel for uniaxial pressing, and a method in which continuous fibers are fed to a position above a vessel, then cut with a cutter or the like and dropped.

In all of the above feeding methods, it is desirable that uniform filling be attained. To this end, it is preferable to move a filling device and/or a filling vessel so as to shift a falling position or a filling position during the filling operation. As the vessel for uniaxial pressing it is desirable to use a uniaxial pressing die because the use thereof permits simplification of the process.

In the present invention it is desirable that the infusiblized fiber be used alone. If desired, however, it may be used in the form of a mixture with a pitch-based carbonized fiber. The "carbonized fiber" as referred to herein indicates a fiber obtained by subjecting the infusiblized fiber to a known carbonization treatment.

The carbonization treatment is performed in a non-oxidizing treatment, preferably in an inert gas, usually at a temperature of 350° to 1,000° C., preferably 350° to 850° C., more preferably 400° to 700° C., for 10 minutes to 5 hours. It is preferable that the carbonized fiber thus obtained have a hydrogen/carbon element ratio of not higher than 0.41, more preferably in the range of 0.01 to 0.35. If the hydrogen/carbon element ratio exceeds this range, there will occur fusion-bonding of fibers in the subsequent step, resulting in that it is difficult to attain the desired reinforcing effect. Also, a hydrogen/carbon element ratio below the above range is not desirable because the moldability will be deteriorated.

The use of the carbonized fiber in combination with the infusiblized fiber exhibits a technical effect in the case where the infusiblized fiber has an adhesive property and there is a fear of adhesion of its constituent fibers to each other or in the case where the resulting molded product exhibits a brittle property.

The carbonized fiber is used usually in an amount of 5 to 1,000 parts by weight, preferably 5 to 100 parts by weight, for 100 parts by weight of the infusiblized fiber. If the amount thereof is smaller than 5 parts by weight, there will be little effect of the combination, and if it is larger than 1,000 parts by weight, the moldability will be deteriorated.

The method of charging a mixture of both such fibers into a vessel or the like is the same as in the foregoing charging method for the infusiblized fiber. It is desirable that both fibers be mixed at the time of filling.

As examples of method for mixing both fibers in a predetermined mixing ratio at the time of charging them as continuous fibers into a vessel, there are mentioned a method in which, before filling, the number of monofilaments contained in each fiber bundle is set at a predetermined ratio, and a method in which there are provided a pulley or ejection (hereinafter referred to as "filling device") for the infusiblized fiber and a filling device for the carbonized fiber and adjustment is made with respect to the filling speed of each component or the number of filling device for each component. By using these methods it is made possible to mix the components at accurate respective proportions and intimately.

As examples of methods for charging both fibers as short fibers into a vessel or the like, there are mentioned a method in which both infusiblized fiber and carbonized fiber, which have been made into short fibers, are deposited by free falling into the vessel, and a method in which both fibers are fed as continuous fibers to above the vessel, then cut with a cutter or the like and thereby allowed to fall.

In all of the above filling methods it is desired that the filling be effected uniformly. To this end, it is desirable to move the filling device and/or the filling vessel so as to shift the falling position or the filling position during the filling operation. As the vessel, the use of a die or the like for uniaxial pressing is preferred because the process is simplified.

After such filling operation and before or after the carbonization and molding under uniaxial pressing, a needle punch processing may be performed in a direction perpendicular to the fiber lamination plane direction.

The carbonization and molding under uniaxial pressing are carried out using a hot press, usually at a pressure of 0.01 to 95 kg/cm$^2$, preferably 0.05 to 50 kg/cm$^2$, more preferably 1 to 20 kg/cm$^2$ at a temperature of usually 300° to 2,000° C., preferably 300° to 1,000° C., more preferably 400° to 750° C. for usually 10 minutes to 10 hours, preferably 30 minutes to 4 hours. It is preferred that this step be conducted in a non-oxidizing atmosphere of, for example, nitrogen, helium, neon, argon, xenon or radon or in vacuum. Even an oxidizing atmosphere may be used if only the temperature is held at a relatively low level, for example, in the range of 300° to 600° C., and the treatment time is short.

In this way, a carbon/carbon composite preform is obtained. In the present invention, the preform may be subjected to a densifying step to obtain a densified carbon/carbon composite ("densified composite" hereinafter).

The void volume of the carbon/carbon composite preform is usually in the range of 5 to 70 vol. %, preferably 10 to 60 vol. %, more preferably 15 to 50 vol. %. If the void volume exceeds this range, the shape retaining property of the carbon/carbon composite will be deteriorated and in the subsequent step there will occur chipping or deformation of the preform. And if the void volume is below the above range, the densified composite will under a brittle fracture and exhibit a behavior like a monolithic material, thus not exhibiting its inherent characteristics.

The bulk density of the carbon/carbon composite preform is usually in the range of 0.10 to 1.70 g/cm$^3$, preferably 0.20 to 1.60 g/cm$^2$, more preferably 0.50 to 1.30 g/cm$^3$. A bulk density thereof below this range is not desirable because it will cause deterioration in the shape retaining property of the carbon/carbon composite and there will occur chipping or deformation of the preform in the subsequent step. A bulk density thereof exceeding the above range is not desirable, either, because the densified composite will undergo a brittle fracture and exhibit a behavior like a monolithic material, thus making it impossible to utilize the features inherent in the composite material.

Prior to the densifying treatment there may be performed carbonization or graphitization under atmospheric pressure for the preform. In this case, the carbonization or graphitization is conducted in a non-oxidizing atmosphere usually at a temperature of 400° to 3,000° C., preferably 500° to 2,500° C.

How to perform the densifying treatment is not specially limited if only it produces a carbonaceous matrix. There may be adopted a known method. Particularly preferred is a method using a matrix obtained by chemical vapor deposition and/or a matrix starting from pitch.

In the case where the densifying treatment is performed by chemical vapor deposition, a thermal decomposition is conducted using as a starting material a hydrocarbon gas such as, for example, methane, ethane, acetylene, propane, benzene or natural gas, or at least one of those gases diluted with an inert gas or hydrogen for example, thereby allowing the thermally decomposed carbon to be deposited within the primary molded product. As an inert gas there may be used, for example, argon, nitrogen or helium.

The thermal decomposition temperature is usually in the range of 700° to 3,000° C., preferably 800° to 2,500° C. As to the thermal decomposition pressure, a reduced pressure is preferred although this treatment may be conducted even at atmospheric pressure. Usually the pressure is in the range of 0.5 to 100 Torr, preferably 0.5 to 50 Torr.

A diluting gas such as an inert gas or hydrogen may be used for the purpose of controlling the reaction rate. In this case, the diluting gas is used in an amount of 1 to 1,000 times, preferably 1 to 100 times, the volume of the above hydrocarbon gas used.

If the proportion of the diluting gas is below the above range, there will not be obtained a satisfactory diluting effect, and if it exceeds the above range, the reaction rate will be decreased to a greater extent than required. Thus, both such proportions are not desirable.

In the case where the densifying treatment is carried out by the use of a matrix starting from pitch, there usually is adopted a method in which the preform is impregnated with a carbonaceous pitch and thereafter carbonized.

The carbonaceous pitch is not specially limited. There may be used a known one. Particularly preferred is a coal or petroleum pitch having a softening point of usually 100° to 400° C., preferably 150° to 350° C. Both optically isotropic and anisotropic carbonaceous pitches are employable, but an optically anisotropic pitch having an optically anisotropic phase content of 60% to 100% is especially preferred.

How to effect the impregnation is not specially limited. A known method may be adopted. For example, the impregantion may be carried out by sealing the primary molded product and the carbonnaceous pitch into a vacuum vessel and heat-melting them under a reduced pressure, e.g. $1\times10^{-2}$~300 Torr. The heating temperature is usually above the softening point of the carbonaceous pitch and below the decomposition start temperature thereof, preferably higher by 30° C. or more than the softening point and below the decomposition start temperature, more preferably 100° to 400° C.

The carbonization is preferably conducted under pressure or pressing.

The carbonization under pressure is performed, for example, by evacuating a vessel containing an impregnated primary molded product, then pressurizing usually to 50–10,000 kg/cm², preferably 100–2,000 kg/cm³, using an inert gas such as, for example, nitrogen, argon or helium, followed by heating to 400°–2,000° C., preferably 500°–1,500° C.

The carbonization under pressing is carried out by uniaxial pressing usually to 10–500 kg/cm², preferably 20–200 kg/cm² and heating usually to 400°–2,000° C., preferably 500°–1,500° C.

A suitable value of a volumetric content (Vf) of fibers in the carbon/carbon composite may be selected according to purpose, but usually 5% to 70%.

According to the present invention it is possible to prepare the carbon/carbon composite in a simple manner without going through any complicated step.

The following examples are given to illustrate the present invention more concretely, but it is to be understood that the invention is not limited thereto.

EXAMPLE 1

An optically anisotropic petroleum pitch having a softening point of 280° C. was melt-spun to obtain pitch fibers having an average diameter of 13 μm. A tow of 2,000 such pitch fibers was made infusible in air at 200° C. for 1 hour to obtain a tow of infusiblized fibers. This tow of infusiblized fibers was passed as continuous fibers onto a pulley and fed into a hot pressing die continuously from above the die. The die was moved to permit uniform deposition of the infusiblized fibers in the interior of the die (FIG. 1). Thereafter, the infusiblized fibers were carbonized under pressing by means of a hot press at a pressure of 5 kg/cm², at 700° C., for 1 hour, to afford a preform having a void volume of 25% and a bulk density of 1.1 g/cm³. When the preform was taken out from the die, there was recognized no change in shape.

EXAMPLE 2

The preform of Example 1 was then subjected to a densifying treatment by chemical vapor deposition using methane as a starting gas at 1,200° C., at 1.5 Torr, for 120 hours, to obtain a carbon/caron composite. The composite had a void volume of about 4% and was not cracked. It retained the shape of the preform.

EXAMPLE 3

An optically anisotropic petroleum pitch having a softening point of 280° C. was melt-spun to obtain pitch fibers having an average diameter of 13 μm. A tow of 2,000 such pitch fibers was subjected to an infusiblizing treatment in air at 300° C. for 1 hour. This tow of infusiblized fibers was passed as continuous fibers onto a pulley and fed into a hot pressing die continuously from above the die. The die was moved to permit uniform deposition of the infusiblized fibers in the interior of the die. Thereafter, the infusiblized fibers were carbonized under pressing by means of a hot press at a pressure of 10 kg/cm², at 600° C., for 1 hour, to obtain a preform having void volume of 30% and a bulk density of 1.1 g/cm³.

The preform (primary molded product) was then calcined in nitrogen at 1,000° C., at atmospheric pressure, to afford a preform having a void volume of 30% and a density of 1.2 g/cm³. This preform retained the shape of the as-molded product.

EXAMPLE 4

The preform of Example 3 was then subjected to a densifying treatment by chemical vapor deposition using methane as a starting gas at 1,100° C. at 1 Torr, for 120 hours, to obtain a carbon/carbon composite. The composite has a void volume of about 4% and was not cracked. It retained the shape of the primary molded product.

COMPARATIVE EXAMPLE 1

A tow of carbon fibers was passed as continuous fibers onto a pulley and fed into a not pressing die continuously above the die. The die was moved to permit uniform deposition of the carbon fibers in the interior of the die. Thereafter, the carbon fibers were pressed by means of a hot press at a pressure of 10 kg/cm², at 600° C., for 1 hour, and then calcined in nitrogen at 1,000° C., at atmospheric pressure. The resulting calcinate had a large void volume, in which the fibers were not fixed to each other.

Subsequently, there was performed a densifying treatment by chemical vapor deposition using methane as a starting gas at 1,100° C., at 1 Torr, for 120 hours. As a result, the molded product was swollen and deformed, and the dispersion of fibers was not uniform.

EXAMPLE 5

An optically anisotropic petroleum pitch having a softening point of 280° C. was melt-spun to obtain pitch fibers having an average diameter of 13 µm. A tow of 2,000 such pitch fibers was made infusible in air to obtain a tow of infusiblized fibers. Subsequent heat treatment at 650° C. for 1 hour afforded carbonized fibers having a hydrogen/carbon element ratio of 0.10.

Next, ten tows each consisting of 2,000 such infusiblized fibers and one tow of 2,000 carbonized fibers were simultaneously dropped little by little into a die while the die was moved to permit intimate mixing of the two in the interior of the die.

Thereafter, the mixed fibers were carbonized under pressing by means of a hot press at a pressure of 5 kg/cm$^2$, at 700° C., for 1 hour, to obtain a carbon/carbon composite having a void volume of 16% and a bulk density of 1.35 g/cm$^3$. When the composite was taken out from the die, there was recongnized no change in shape.

EXAMPLE 6

An optically anisotropic petroleum pitch having a softening point of 280° C. was melt-spun to obtain pitch fibers having an average diameter of 13 µm. A tow of 2,000 such pitch fibers was rendered infusible in air to obtain infusiblized fibers. Subsequent heat treatment in nitrogen at 650° C. for 1 hour afforded carbonized fibers having a hydrogen/carbon element ratio of 0.10.

Next, a tow of 2,000 such infusiblized fibers and a tow of 2,000 such carbonized fibers were simultaneously dropped little by little into a die while the die was moved to permit intimate mixing of the two in the interior of the die.

Thereafter, the mixed fibers were carbonized under pressing by means of a hot press at a pressure of 5 kg/cm$^3$, at 700° C., for 1 hour, to obtain a carbon/carbon composite having a void volume of 30% and a density of 1.1 g/cm$^3$. When the composite was taken out from the die, there was no change in shape.

The carbon/carbon composite was then subjected to a densifying treatment by chemical vapor deposition using methane as a starting gas at 1,200° C., at 1.5 Torr, for 120 hours, to obtain a densified carbon/carbon composite. The densified composite had a void volume of about 5% and was not cracked. It retained the shape of the carbon/carbon composite obtained initially.

EXAMPLE 7

Ten tows each consisting of 1,000 infusiblized fibers and one tow of 1,000 carbonized fibers, both fibers obtained in Example 6, were simultaneously dropped little by little into a die while the die was moved to permit intimate mixing of the two in the interior of the die.

Thereafter, the mixed fibers were carbonized under pressing by means of a hot press at a pressure of 5 kg/cm$^2$, at 700° C., for 1 hour, to obtain a carbon/carbon composite having a void volume of 25% and a bulk density of 1.2 g/cm$^3$. When the composite was taken out from the die, there was no change in shape.

The carbon/carbon composite was then subjected to a densifying treatment by chemical vapor deposition using methane as a starting gas at 1,200° C., at 1.5 Torr, for 120 hours. The thus-densified carbon/carbon composite had a void volume of about 5% and was not cracked. It retained the shape of the carbon/carbon composite obtained initially.

EXAMPLE 8

Ten tows each consisting of 500 infusiblized fibers and three tows each consisting of 500 carbonized fibers, both fibers obtained in Example 6, were simultaneously dropped little into a die while the die was moved to permit intimate mixing the two in the interior of the die.

Thereafter, the mixed fibers were carbonized under pressing by means of a hot press at a pressure of 5 kg/cm$^2$, at 700° C., for 1 hour, to obtain a carbon/carbon composite having a void volume of 20% and a bulk density of 1.3 g/cm$^3$. When the composite was taken out from the die, there was recognized no change in shape.

The carbon/carbon composite was then subjected to a densifying treatment using methane as a starting gas at 1,200° C., at 1.5 Torr, for 120 hours. The thus-densified carbon/carbon composite had a void volume of about 5% and was not cracked. It retained the shape of the carbon/carbon composite obtained initially.

COMPARATIVE EXAMPLE 2

A tow of 2,000 carbon fibers was dropped little by little into a die while granular pitch was also dropped into the die and the die was moved to permit intimate mixing of the two.

Subsequently, carbonization was performed under pressing using a hot press at a pressure of 10 kg/cm$^2$, at 600° C., for 1 hour, to afford a carbon/carbon composite having a void volume of 30% and a bulk density of 1.1 g/cm$^3$.

The composite was then calcined in nitrogen at 1,000° C. and at atmospheric pressure; as a result, it was cracked at its central part and it was impossible to obtain a densified carbon/carbon composite using such calcinate.

COMPARATIVE EXAMPLE 3

An optically anisotropic petroleum pitch having a softening point of 280° C. was melt-spun to obtain pitch fibers having an average diameter of 13 µm. A tow of 2,000 such pitch fibers was made infusible in air at 260° C. for 1 hour to obtain a tow of infusiblized fibers. This tow of infusiblized fibers was passed as continuous fibers onto a pulley and fed into a hot pressing die continuously from above the die. The die was moved to permit uniform deposition of the infusiblized fibers in the interior of the die. Thereafter, the infusiblized fibers were carbonized under pressing by means of a hot press at a pressure of 100 kg/cm$^2$, at 700° C., for 1 hour, to afford a preform (primary molded product) having a void volume of 4% and a bulk density of 1.0 g/cm$^3$. When the preform was taken out from the die, there was recognized no change in shape.

COMPARATIVE EXAMPLE 4

The preform of comparative Example 3 was then subjected to a densifying treatment by chemical vapor deposition using methane as a starting gas at 1,200° C., at 1.5 Torr, for 120 hours, to obtain a carbon/carbon composite. The composite had a void volume of about % and showed brittle fracture at bending tests.

What is claimed is:

1. A process for preparing a carbon/carbon composite preform as a primary molded product comprising subjecting fibers consisting of pitch-based infusiblized fibers to forcible charging, free falling or uniform feeding treatment into a vessel and depositing treatment therein using uniform filling methods, and subjecting thus deposited fibers to carbonization and molding treatment under uniaxial pressing, said carbon/carbon composite preform having a void volume of 5–70 vol. % and a bulk density of 0.10–1.35 g/cm$^3$.

2. A process as set forth in claim 1, wherein the carbonization and molding are performed using a hot press at a pressure of 0.01 to 95 kg/cm$^2$ and at a temperature of 300° to 2,000° C.

3. A process for preparing a carbon/carbon composite comprising subjecting the carbon/carbon composite preform prepared by the process as set forth in claim 1 to a densifying treatment using a carbonaceous matrix.

4. A process as set forth in claim 3, wherein the carbonaceous matrix is a carbonaceous matrix obtained by a chemical vapor deposition of a hydrocarbon gas or is a pitch-based carbonaceous matrix.

5. A process as set forth in claim 4, wherein the chemical vapor deposition for densifying is carried out by heating the hydrocarbon gas, optionally together with a diluting gas, to a temperature of 700° to 3,000° C. in the presence of the primary molded product, allowing carbon formed by thermal decomposition to be deposited within the preform.

6. A process as set forth in claim 4, wherein the densifying using the pitch-based carbonaceous matrix is carried out by heating the preform and a carbonaceous pitch to a temperature above a softening point of the pitch and below a decomposition start temperature thereof under a reduced pressure, allowing the pitch to be impregnated into the preform, and subsequent heating to a temperature of 400° to 2,000° C. under pressure or under pressing.

7. A process as set forth in claim 6, wherein the pitch has an optically anisotropic phase content of 60% to 100%.

8. A process as set forth in claim 1, wherein said infusiblized fibers are in the form of continuous filament fibers and are charged into a vessel whereby said infusiblized fibers are allowed to fall into the vessel, are fed to a pulley and fed uniformly into the vessel, or are charged into the vessel forcibly through an air ejector.

9. A process as set forth in claim 1, wherein said infusiblized fibers are in the form of short fibers of 1 to 100 cm long and are charged into the vessel.

10. A process as set forth in claim 1, wherein said infusiblized fibers are fed, dropped or charged into the vessel using a fiber filling device which may be removed so as to shift the fiber falling position and/or filling position during the filling operation.

11. A process as set forth in claim 9, wherein said short fibers are freely dropped into the vessel.

12. A process as set forth in claim 9, wherein continuous filament fibers are fed to the position just above the vessel and then cut with a cutter into the form of short fibers of 1 to 100 cm long and dropped into the vessel.

* * * * *

UNITED STATES PATENT AND TRADEMARK OFFICE
CERTIFICATE OF CORRECTION

PATENT NO. : 5,614,134
DATED : March 25, 1997
INVENTOR(S) : Yoshio Sohda, et al.

It is certified that error appears in the above-identified patent and that said Letters Patent are hereby corrected as shown below:

Column 1, line 34: "Fabrics" should read --fabrics--

Column 4, line 47: "g/cm$^2$" should read --g/cm$^3$--

Column 5, lines 41-42: "1X10$^-$$_2$" should read --1X10$^{-2}$--

Column 5, line 53: "kg/cm$^3$" should read --kg/cm$^2$--

Signed and Sealed this

Twenty-fifth Day of August, 1998

Attest:

BRUCE LEHMAN

Attesting Officer     Commissioner of Patents and Trademarks